US 6,750,168 B2

(12) United States Patent
Yan et al.

(10) Patent No.: US 6,750,168 B2
(45) Date of Patent: Jun. 15, 2004

(54) HIGH-TEMPERATURE AGING TOLERANCE CATALYZED ADSORBER SYSTEM FOR TREATING INTERNAL COMBUSTION ENGINE EXHAUST GAS

(75) Inventors: JiYang Yan, Broken Arrow, OK (US); Heinz J. Robota, Tulsa, OK (US)

(73) Assignee: Delphi Technologies, Inc., Troy, MI (US)

( * ) Notice: Subject to any disclaimer, the term of this patent is extended or adjusted under 35 U.S.C. 154(b) by 169 days.

(21) Appl. No.: 09/730,508

(22) Filed: Dec. 5, 2000

(65) Prior Publication Data

US 2002/0068679 A1 Jun. 6, 2002

(51) Int. Cl.$^7$ ................................. B01J 29/06
(52) U.S. Cl. ........................... 502/79; 502/60; 502/64; 502/66; 502/74
(58) Field of Search ............................ 502/60, 64, 66, 502/74, 79

(56) References Cited

U.S. PATENT DOCUMENTS

| | | | |
|---|---|---|---|
| 3,833,499 A | 9/1974 | Egan et al. | |
| 4,151,121 A | 4/1979 | Gladrow | |
| 4,711,770 A | 12/1987 | Skeels et al. | |
| 4,882,307 A | 11/1989 | Tsao | |
| 4,985,210 A | 1/1991 | Minami | |
| 5,051,244 A | 9/1991 | Dunne et al. | |
| 5,078,979 A | 1/1992 | Dunne | |
| 5,168,085 A | 12/1992 | Addiego et al. | |
| 5,179,053 A | 1/1993 | Subramanian et al. | |
| 5,273,945 A | 12/1993 | des Courieres et al. | |
| 5,278,113 A | 1/1994 | Ono et al. | |
| 5,354,720 A | 10/1994 | Leyrer et al. | |
| 5,447,694 A | 9/1995 | Swaroop et al. | |
| 5,459,119 A | 10/1995 | Abe et al. | |
| 5,510,086 A | 4/1996 | Hemingway et al. | |
| 5,531,068 A | 7/1996 | Kass et al. | |
| 5,662,869 A | * 9/1997 | Abe et al. ................... | 422/171 |
| 5,772,972 A | 6/1998 | Hepburn et al. | |
| 6,047,544 A | * 4/2000 | Yamamoto et al. ......... | 422/171 |
| 6,074,973 A | * 6/2000 | Lampert et al. ........ | 423/213.2 |
| 6,139,808 A | * 10/2000 | Mizuno et al. ............ | 422/171 |
| 6,555,079 B2 | 4/2003 | Hoke et al. ................ | 423/210 |
| 2002/0057997 A1 | * 5/2002 | Mizuno et al. ............ | 422/171 |
| 2002/0068679 A1 | 6/2002 | Yan et al. ..................... | 502/66 |
| 2002/0132724 A1 | * 9/2002 | Labarge et al. ............... | 502/64 |
| 2002/0141921 A1 | 10/2002 | Wu et al. ................ | 423/239.1 |
| 2003/0012707 A1 | 1/2003 | Yamamoto et al. ......... | 422/177 |
| 2003/0083193 A1 | 5/2003 | Takaya et al. .............. | 502/304 |

FOREIGN PATENT DOCUMENTS

| | | | |
|---|---|---|---|
| EP | 0 749 774 | * | 12/1996 |
| EP | 0 848 984 | * | 6/1998 |
| EP | 0 904 827 | * | 3/1999 |

* cited by examiner

*Primary Examiner*—Kiley Stoner
*Assistant Examiner*—Christina Ildebrando
(74) *Attorney, Agent, or Firm*—Jimmy L. Funke

(57) ABSTRACT

A catalyzed adsorber that is effective and durable in treating exhaust gas from internal combustion engines, and in particular, for adsorbing hydrocarbons contained in engine exhaust gas during cold start, releasing these hydrocarbons when the engine exhaust gas has heated the adsorber to normal operating temperature and catalyzing the conversion of these hydrocarbons to carbon dioxide and water. The catalyzed adsorber has a catalyst overlayer with a non-catalyst overcoat loading of about 1.0 g/in$^3$ or less.

36 Claims, 2 Drawing Sheets

HIGH-TEMPERATURE AGING TOLERANCE CATALYZED ADSORBER SYSTEM FOR TREATING INTERNAL COMBUSTION ENGINE EXHAUST GAS

This invention relates to catalyzed adsorbers for treating motor vehicle exhaust gas comprising a substrate having dispersed thereon a zeolite and an inorganic oxide washcoat, the washcoat having been impregnated with a catalytically effective amount of noble metals prior to being mixed or layered with the zeolite and optionally with a promoter. This invention further relates to a system of using such catalyzed adsorbers.

BACKGROUND OF THE INVENTION

Catalytic converters containing various catalysts have been employed for years by automobile manufacturers to meet the ever-more-stringent regulations on emissions of hydrocarbons, carbon monoxide and nitrogen oxides from internal combustion engines. The continuing evolution and tightening of these regulations has made necessary the development of systems that control emission of hydrocarbons during the period immediately after start of a cold engine and before the catalytic converter normally supplied by automobile manufacturers has been sufficiently warmed by engine exhaust gas to be effective in converting hydrocarbons (often referred to as "cold start conditions"). An attractive approach has been the incorporation in the exhaust system of an adsorbent capable of adsorbing hydrocarbons at the low exhaust gas temperatures associated with cold start (0 to 250° C.) and further capable of releasing those hydrocarbons when normal exhaust system operating temperatures are achieved. Such an adsorber would normally be combined with a conventional three-way catalyst (i.e., a catalyst capable of oxidizing hydrocarbons and carbon monoxide while reducing nitrogen oxides, often referred t as a "TWC") or some other non-adsorber-containing catalyst.

TWC's of various types have been employed by themselves in the reduction of automobile emissions and have been effective in meeting the standards of the past. Ever-tightening regulations have, however, made necessary a more effective system for controlling emissions of unburnt hydrocarbons from internal combustion engines during cold start. The present invention provides such an improved system.

Various researchers have taught catalyst formulations and methods for preparation that resemble superficially the catalyzed adsorbers and method for their preparation taught here. For example, U.S. Pat. No. 4,151,121 (Gladrow) teaches a catalyst for promoting the combustion of CO in the regenerators of fluid catalytic crackers to avoid afterburning. The catalysts of that patent comprise a Group VIII element supported on an inorganic oxide and admixed with a zeolite, but also requires the presence of rhenium, chromium, manganese, or some combination thereof.

U.S. Pat. No. 5,273,945 (des Courieres et al.) also teaches catalysts for fluid catalytic cracking having metal supported on inorganic oxide binder or zeolite, but is indifferent to the nature of the metal employed and as to whether the metal is supported on the inorganic oxide or the zeolite.

In similar fashion, U.S. Pat. No. 3,833,499 (Egan et al.) teaches a catalyst for hydrocracking of hydrocarbons that employs palladium impregnated on an inorganic oxide prior to addition to a zeolite, but requires that the zeolite already be impregnated with palladium.

U.S. Pat. No. 5,278,113 (Ono et al.) teaches a catalyst for deodorization in room heating comprising a platinum group metal dispersed on alumina prior to being mixed with a zeolite. The catalyst of that invention is intended to effect the adsorption of odors from the environment in which it is deployed, periodically being heated to release and oxidatively decompose the odor components and thereby regenerating the catalyst.

More closely on point in the sense that the intended use is for treatment of motor vehicle engine exhaust gas, U.S. Pat. No. 5,354,720 (Leyer et al.) teaches a catalyst for reducing the quantity of nitrogen oxides in lean exhaust gas that comprises a first layer of aluminum or cerium oxide impregnated with a mixture of platinum and iridium and a second layer of zeolite impregnated with copper and/or iron. The present invention is concerned with reducing the amount of hydrocarbons contained in an exhaust gas stream containing a lower oxygen concentration than those taught by the Leyer patent.

U.S. Pat. No. 5,510,086 (Hemingway, et al.) teaches the use of three catalyst zones for the reduction of automobile exhaust emissions, the first of which is a conventional TWC, followed in the direction of the exhaust flow by a hydrocarbon adsorber/catalyst, which is in turn followed by another TWC. The hydrocarbon adsorber/catalyst is claimed to have a coating comprising an adhered washcoat including a zeolite and palladium. However, '086 teaches that the noble metal is to be applied to the zeolite, thereby yielding a catalytic adsorber inferior in performance of that of the instant application.

European Patent Application No. 94309790.7 (Abe, et al.) teaches the use of one honeycomb monolith substrate which is coated in one region of the substrate with adsorbent for hydrocarbon, and in a completely different and distinct region of the substrate is coated with a catalyst layer active for three-way catalytic activity. The catalyst and adsorber in this example are not combined in any manner.

European Patent Application No. 95110617.8 (Hertl, et al) teaches a three brick system like Hemingway's, with the middle adsorber brick containing a hole in the honeycomb monolith substrate to allow gas to bypass the adsorber. The invention further requires some sort of means to divert exhaust flow into or away from the adsorber brick.

SUMMARY OF THE INVENTION

The problems and disadvantages of the prior art are overcome and alleviated by the high-temperature aging tolerance catalyzed adsorber system for treating internal combustion engine exhaust gas. The catalyzed adsorber comprises: a substrate; a zeolite underlayer disposed over the substrate; and a catalyst overlayer disposed over the underlayer wherein the overlayer has a non-catalyst loading of about 1.0 grams per cubic inch of substrate ($g/in^3$) or less.

Meanwhile, the method for making the catalyzed adsorber comprises: providing a substrate; disposing a zeolite underlayer over the substrate; and disposing a catalyst overlayer over the underlayer wherein the overlayer has a non-catalyst loading of about 1.0 $g/in^3$ or less.

The above-described and other features and advantages of the present invention will be appreciated and understood by those skilled in the art from the following detailed description, drawings, and appended claims.

DETAILED DESCRIPTION OF THE INVENTION

Figure 1:
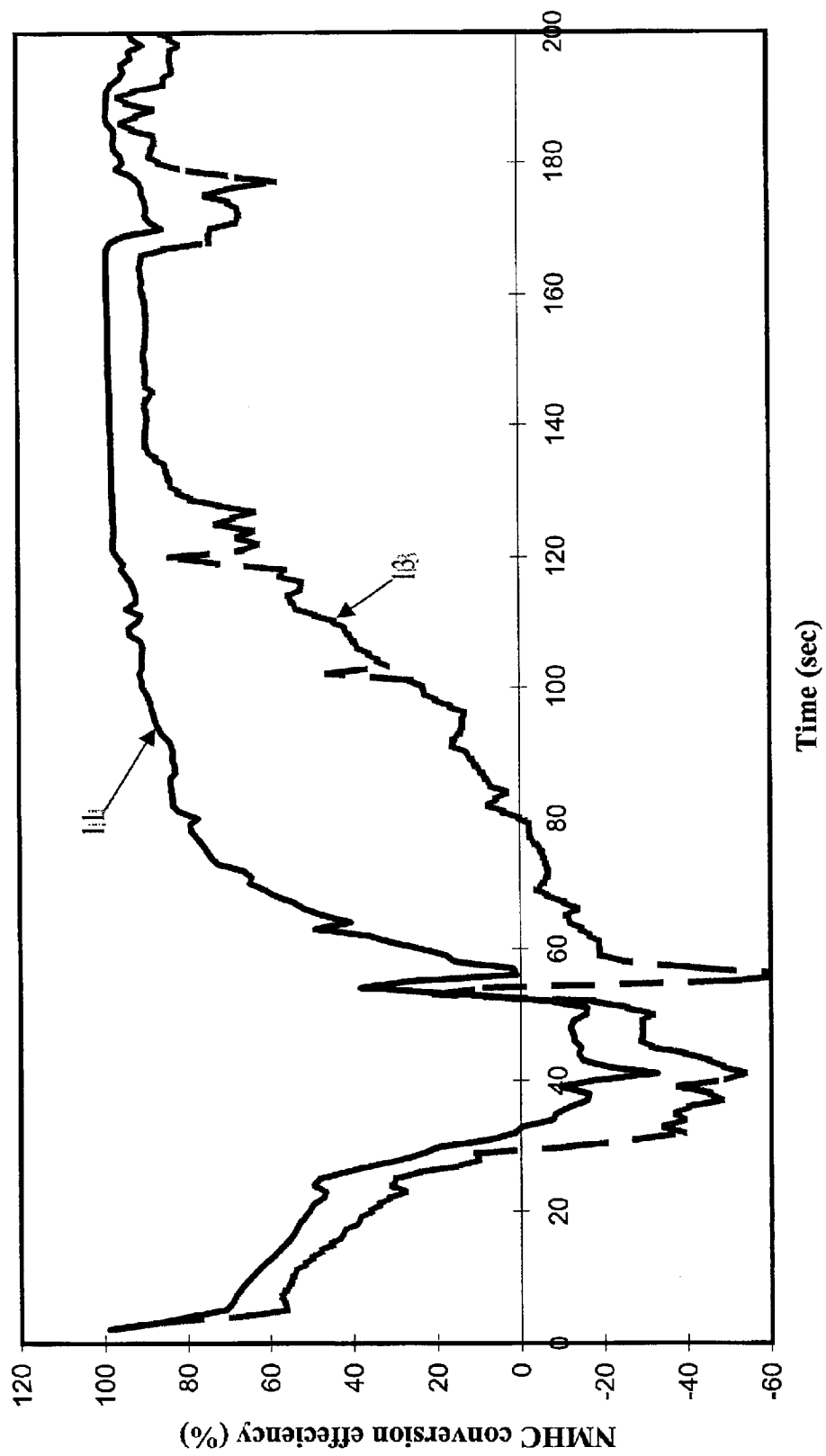
FIG. 1 shows a comparison of fresh and severely aged adsorbers with aging performed on a gasoline engine dynamometer with catalyst bed temperature averaging 960° C. (peak temperature was 975° C.), and with a duration of 75 hours.

The catalyzed adsorber of the present invention comprises a substrate which has been coated with a suitable zeolite and an inorganic oxide washcoat, the washcoat having been impregnated with a catalytically effective amount of a noble metal, and optionally admixed with a promoter, prior to being mixed with the zeolite. The noble metal and washcoat can optionally be layered on top of or underneath the zeolite layer and optional promoter, or multiple layers of zeolite and washcoat can be applied to the substrate in any combination. An important element of the present invention is the impregnation of washcoat with the noble metal prior to mixing or layering with zeolite. This prevents the noble metal or its chemical precursors from interacting with the zeolite, which would negatively impact the performance of the catalyzed adsorber after aging.

Deployment of Catalyzed Adsorber in Emissions Control System

The catalyzed adsorber ("A-brick") of the present invention may be used alone or in conjunction with a pre-adsorber catalyst ("P-brick") and/or a post-adsorber TWC ("C-brick") to reduce hydrocarbons emissions during cold start conditions of a vehicle. It is preferred that the catalyzed adsorber be placed in a location where the heat emitted by the engine will not damage the zeolite and where the temperature window is suitable for the A-brick to work well, such as in the underfloor position. If used in conjunction with a P-brick alone, the catalyzed adsorber of the present invention should be placed downstream of the P-brick; if used as part of a pre-adsorber catalyst/adsorber of the present invention/post-adsorber catalyst ("PAC") system, the catalyzed adsorber should be placed downstream of the P-brick and upstream of the C-brick. The P-brick and C-brick may be any noble metal catalyst formulation which may be used as a TWC, such as, but not limited to, Pd-only, Rh-only, Pd/Rh, Pt/Rh, or Pt/Pd/Rh. The P-brick preferably will be designed to provide rapid light-off and conversion of hydrocarbons.

Substrate

The substrate should be inert in the sense that it does not react with the coating or with the exhaust gas to which it is exposed during engine operation. The substrate may be any of the shapes employed by those skilled in the art such as extrudates, spheres, beads, tablets, ceramic foams, and the like, but monoliths, either metallic or ceramic, are preferred.

If a monolith is employed as a substrate, it should be sized and shaped so that it fits within whatever vessel is employed as a container and leaves no gaps between the vessel interior wall and the outside surface of the monolith which might result in blow-by of the exhaust gas past the monolith (i.e., bypassing of the catalyzed adsorber). Ceramic monoliths, if employed, should be provided with a mat-mount between the exterior surface of the monolith and the vessel wall, as is customary in the industry, to cushion vibration during engine operation and to prevent blow-by of the engine exhaust gas past the catalyst. Metallic monoliths should be attached to the vessel wall, as is customary.

Monolith coating loads will depend on the engine and vehicle characteristics along with the zeolite capacity and noble metal activity, but should be coated with about 1 gram of zeolite plus washcoat to about 6 grams of zeolite plus washcoat per cubic inch of substrate, preferably about 2 to about 5 grams of zeolite plus washcoat per cubic inch of substrate.

Zeolite

Several different zeolites may be advantageously used in the catalyzed adsorbers of the present invention. To a great extent, the choice of zeolite is dictated by the characteristics of exhaust gas for which treatment is intended. In all cases, the zeolite by itself must be capable of retaining adsorption capacity for hydrocarbons when exposed to the same operating conditions as a conventional TWC located in an underfloor position for 100,000 miles.

In all applications, however, the zeolite chosen must have the following characteristics:

a) It must be capable of adsorbing hydrocarbon preferentially over water in the range of operating temperatures which it will encounter in its application; that is, from near ambient temperature to normal operating temperature, and when exposed to exhaust gas compositions, which generally include about 10 vol. % steam.

b) It should have a high heat of adsorption for all the hydrocarbon molecules contained in the exhaust gas to be treated. The heat of adsorption should be at least about 4.5 kilo-calorie per gram-mole. (kcal/g-mole) of hydrocarbon adsorbed at 150° C., and preferably about 9.5 kcal/g-mole of hydrocarbon adsorbed at 150° C.

c) It must be stable when exposed to exhaust gas normal operating conditions and should be capable of withstanding the accelerated aging conditions employed by automobile manufacturers to test emission control systems durability. Preferably, the zeolite chosen should be capable of experiencing little damage to its hydrocarbon storage and release properties from exposure to steam at temperatures up to about 850° C. and should not be subject to crystal collapse at temperatures below 980° C.

d) It must be, after mixture or layering with the inorganic oxide binder chosen for the desired application, suitable for application on a monolithic substrate, yielding a tough, adherent coating not subject to dusting, flaking, or spalling.

e) It must be able to withstand mild milling required to insure coatability prior to admixing or layering with the noble-metal-treated inorganic oxide washcoat.

The preferred zeolite to be used in the manufacture of a catalyzed adsorber of the present invention is a faujasite having a Si/Al ratio between about 3.0 and about 10 and a Na content less than about 0.1 wt. %. The low sodium content is achieved by ion exchanging the zeolite with ammonium cation or other metal cations by means well known in the art. An example of the preferred zeolite is LZ-210 manufactured by UOP, Inc. winch is described in U.S. Pat. No. 4,711,770, incorporated herein by reference.

Inorganic Oxide Washcoat

The inorganic oxide washcoat serves two functions simultaneously. First, the washcoat serves as a noble metal support. Second, when mixed with zeolite before application to a substrate, the washcoat improves the adhesion of the mixture as a whole. The catalyzed adsorber contains at least one inorganic oxide in addition to the noble metal and zeolite, with the noble metal being preferred to go with inorganic oxide, but not with zeolite. In other words, the noble metal layer is preferably zeolite free (e.g., less than about 3%, with 0% preferred), and the zeolite layer is preferably noble metal free (e.g., less than about 3%, with 0% preferred).

Washcoats appropriate for combining or layering with the useful zeolites herein include inorganic oxide(s) such as alumina, silica, alumina-silicates, titania, magnesia, zirconia, beryllia, and the like, as well as compounds and mixtures comprising at least one of the foregoing, with alumina, titania, and zirconia being preferred, delta phase alumina, gamma phase alumina, more preferred, and lanthanum stabilized gamma phase alumina especially preferred. Small amounts, up to about 30 wt. % of a transition metal oxides, such as ceria, lanthana, zirconia, and the like or mixtures comprising at least one of the foregoing transition metal oxides may be added to the washcoat to act as a promoter for the noble metal employed. In addition, a small amount of a stabilizer, such as a barium oxide or barium sulfate may be added. Optionally, the washcoat may consist of a stabilized ceria, such as ceria-zirconia, entirely or in part.

The relative proportions of zeolite and inorganic washcoat in the coating to be applied to the substrate may vary widely with the zeolite content, for example, about 40 to about 80 wt. %, preferably about 70 to about 80 wt. % for catalyzed adsorbers made by mixing the zeolite and washcoat together before application to the substrate and preferably about 40 to about 60 wt. % for catalyzed adsorbers made by layering the zeolite and the washcoat Generally, the washcoat comprises two layers. The underlayer comprises the adsorption material, such as zeolite, and binder. The overlayer comprises noble metal, such as palladium, support material, and promoter, such as a base metal mixed oxide. A standard washcoat loading is for the underlayer to be about 1.5 to about 3.0 gram per cubic inch (g/in$^3$) and for the non-catalyst overlayer loading up to about 1.0 g/in$^3$, with about 0.8 to about 1.0 g/in$^3$ preferred, and about 0.9 to about 1.0 g/in$^3$ especially preferred. The catalyst loading of the overlayer can be up to about 0.5 g/in$^3$, with up to about 0.25 g/in$^3$ preferred, and about 0.1 to about 0.2 g/in$^3$ especially preferred.

Noble Metal

The noble metals of choice are palladium, platinum, rhodium, and mixtures and alloys of rhodium with either palladium or platinum, but any Group VIII metal, or mixture thereof, may be used. The preferred noble metal is palladium due to its relatively low lightoff temperature (i.e., the temperature that results in conversion of 50% of the hydrocarbons contained in the exhaust gas).

Recommended noble metal loading is a function of the metal chosen. For Pd, the loading should be about 50 to about 350 grams of Pd per cubic foot (ft$^3$) of monolithic substrate, and preferably about 90 to about 300 grams of Pd per ft$^3$ of monolithic substrate. For Pt, the loading is typically, but not limited to, about 10 to about 70 grams of Pt per ft$^3$ of monolithic substrate, and preferably about 40 to about 70 grams of Pt per ft$^3$ of monolithic substrate. For Rh, the loading is typically, but not limited to, about 5 to about 30 grams of Rh per ft$^3$ of monolithic substrate, and preferably about 15 to about 30 grams of Rh per ft$^3$ of monolithic substrate.

Preparation of Catalyzed Adsorber

The most convenient method for accomplishing this is through the application of a suitable noble metal reagent directly to the washcoat in the absence of zeolite. Other methods that result in the noble metal being dispersed predominately on the washcoat and not on the zeolite are known and may be employed as a matter of choice. Separating the noble metal from the zeolite helps eliminate interactions between highly acidic and reactive noble metal solutions and the zeolite material. This separation thus improves the durability of the zeolite as well as preserving noble metal dispersion, and it limits potential poisoning of active noble metal sites by the debris or mobile components from the zeolite during high temperature aging. This action also improves the durability of the noble metal thereby improving aged lightoff and steady state conversion of hydrocarbons, carbon monoxide and nitrogen oxides in the engine exhaust with which the catalyzed adsorber is contacted. Having the noble metal in close proximity to the zeolite, on the other hand, is important to prevent coking of the zeolite and to enhance combustion of hydrocarbon as it desorbs from the zeolite.

The preferred method of preparation, then, calls for a wet impregnation of noble metal reagent on an inorganic oxide washcoat, sufficient to provide the desired loading of noble metal on the final catalyzed adsorber part. Any noble metal reagent known to those skilled in the art may be employed. For instance, but not by way of limitation, a 7–8 wt. % aqueous solution of palladium nitrate is impregnated on the washcoat of a catalyzed adsorber employing Pd as the noble metal. A similar solution of platinum nitrate would be preferred for deposition of Pt. The impregnate washcoat is dried for at least 24 hours to allow precious metal to fully chemisorb on the inorganic oxide washcoat and then calcined at a temperature equal to or less than 600° C. for 2 hours. The calcined, impregnated washcoat is then slurried in water and the pH is adjusted to about 3.0 to about 9.0 by the addition of an organic acid or base, preferably acetic acid or TMAOH (tetramethylammonium hydroxide), and the mixture is milled for about 20 minutes to one hour to provide good coatability. Acids such as nitric acid should be avoided due to their tendency to interact adversely with the zeolites. At the same time, additional promoters or additives can be added directly to the slurry, if desired. The washcoat suspension is then combined with an aqueous suspension of zeolite and the whole is milled briefly, as required for good coating.

After stirring the combined mixture for at least an hour, the resulting slurry is applied to the substrate by any of the methods known to those skilled in the art, including, without limitation, immersion of the substrate in the slurry or spraying of the slurry onto the substrate. Following application of the slurry to the substrate, the coated substrate is dried and then calcined at a temperature of about 300 to about 550° C. for about 2 to about 4 hours.

Another method of preparation calls for a wet impregnation of noble metal reagent on an inorganic oxide washcoat, sufficient to provide the desired loading of noble metal on the final catalyzed adsorber part. Any noble metal reagent known to those skilled in the art may be employed. As in the method above, a 7–8 wt % aqueous solution of palladium nitrate is impregnated on the washcoat of a catalyzed adsorber employing Pd as the noble metal, and a similar solution of platinum nitrate would be preferred for deposition of Pt. The impregnated washcoat is dried for at least 24 hours then calcined at a temperature equal to or less than about 600° C. for 2 hours. The calcined, impregnated washcoat is then slurried in water and its pH is adjusted to about 3.1 to about 3.9 by the addition of organic acid, preferably acetic acid, and the suspension is milled for about one hour to provide good coatability. An aqueous suspension of zeolite is prepared separately and then milled briefly, not more than about 10 minutes, as required for good coating.

In the first coating step, the zeolite suspension or the impregnated washcoat suspension is then applied to the substrate by any of the methods known to those skilled in this area, including immersion of the substrate in the suspension or spraying of the suspension onto the substrate. The coated substrate is dried and then calcined at a temperature of about 400 to about 550° C. for about 2 to about 4 hours. The process is repeated with the suspension which was not coated in the first coating step. Following application of the second slurry to the substrate, the layered and coated substrate is dried and then calcined at a temperature of about 400 to about 550° C. for about 2 to about 4 hours. The process may be repeated again as many times as desired if a multi-layered washcoat is required.

EXAMPLE 1

This example describes preparation of a catalyzed adsorber having a zeolite underlayer and noble metal overlayer. The underlayer loading was 1.8 g/in$^3$, with a zeolite to alumina ratio of 5:1, while the overlayer non-catalyst loading (binder, mixed oxide and stabilizer; excluding noble metal (Pd)) is 2.0 g/in$^3$, while the catalyst loading (Pd) is 0.116 g/in$^3$.

An aqueous suspension of UOP CSX zeolite powder and alumina, in which the ratio of zeolite to alumina was about 5 to 1, was prepared and milled for 10 minutes. The suspension was then stirred for three hours, following which it was coated onto ceramic monoliths. The coated monoliths were dried and then calcined at a temperature of about 550° C. for 2 hours.

An aqueous Pd nitrate solution was uniformly impregnated onto a mixture of alumina powder and stabilized mixed oxide powder (83.6 wt. % $ZrO_2$, 14.5 wt. % $CeO_2$, and 1.9 wt. % $La_2O_3$) such that the weight ratio of the stabilized mixed oxide to the alumina was 2.0, and such that the resulting impregnated powder contained 57.9 grams of Pd per kg of alumina/mixed oxide powder. The powder was then calcined for 2 hours at 600° C. An aqueous suspension of the impregnated powder was then prepared and the pH was measured. The pH of the suspension was lowered to about 3.5 with acetic acid and then was milled to obtain a particle size between 7 and 15 microns. The mixture was then stirred for three hours, following which it was coated onto the ceramic monoliths which were previously coated with zeolite. The coated monoliths were dried and then calcined at a temperature of about 550° C. for 2 hours.

EXAMPLE 2

Comparative

This example describes the preparation of a non-catalyzed adsorber sample (e.g., no overlayer (no catalyst)). In this adsorber the "underlayer" had a loading of 2.0 g/in$^3$ with a zeolite to alumina ratio of 5:1.

An aqueous suspension of UOP CSX zeolite powder and alumina, in which the ratio of zeolite to alumina was about 5 to 1, was prepared and milled for 10 minutes. The suspension was then stirred for three hours, following which it was coated onto ceramic monoliths. The coated monoliths were dried and then calcined at a temperature of about 550° C. for 2 hours.

EXAMPLE 3

This example describes preparation of a catalyzed adsorber having a zeolite underlayer and noble metal overlayer. The underlayer loading was 2.7 g/in$^3$, with a zeolite to alumina ratio of 5:1, while the overlayer non-catalyst loading (binder, mixed oxide and stabilizer; excluding noble metal (Pd)) is 0.9 g/in$^3$, while the catalyst loading (Pd) is 0.174 g/in$^3$.

An aqueous suspension of UOP CSX zeolite powder and alumina, in which the ratio of zeolite to alumina was about 5 to 1, was prepared and milled for 10 minutes. The suspension was then stirred for three hours, following which it was coated onto ceramic monoliths. The coated monoliths were dried and then calcined at a temperature of about 550° C. for 2 hours.

An aqueous Pd nitrate solution was uniformly impregnated onto a mixture of alumina powder such that the resulting impregnated powder contained 193 grams of Pd per kg of alumina. The powder was then calcined for 2 hours at 600° C. An aqueous suspension of the impregnated powder was then prepared and the pH was measured. The pH of the suspension was lowered to about 3.5 with acetic acid and then was milled to obtain a particle size between 7 and 15 microns. The mixture was then coated onto the ceramic monoliths which were previously coated with zeolite. The coated monoliths were dried and then calcined at a temperature of about 550° C. for 2 hours.

Reduced Overlayer Design

The washcoat loadings such as those used in the mixed washcoat embodiment have good stability when aged to simulate driving conditions in the United States. The aging procedure used has a catalyst bed temperature of not more than about 910° C. for a duration of 50 hours. However, the aging procedure used to simulate European driving conditions is at a higher temperature averaging about 960° C. with the peak temperature as high as about 975° C. for a longer duration time of about 75 hours. When aged under these European conditions, systems using washcoat loading such as those used in Example 1 (i.e., noble metal washcoat over zeolite layer) had a significant loss in non-methane hydrocarbon (NMHC) adsorption. This is shown in FIG. 1 wherein the NMHC conversion efficiency of a system using a washcoat loading in accordance with Example 1 for a fresh (non-aged) adsorber, line 11, and an adsorber aged by the protocol used to simulate European driving conditions described above, line 13, is illustrated. One theory for the loss of NMHC adsorption is that the overlayer densities during aging. During the high temperature aging, the overlayer gradually loses its porosity. In effect, this diffusion barrier reduces access of the hydrocarbon in the exhaust gas into the underlayer zeolite which renders the diffusion of hydrocarbon from the exhaust gas into the adsorptive material more difficult.

Consequently, it is preferred to have a reduced overlayer loading. That is, the noble metal loading is preferably maintained at the desired amount based upon catalytic activity. The remainder of the overlayer loading, however is reduced to ensure fluid access to the underlayer (zeolite), after severe aging (e.g., temperatures exceeding about 900° C.). As a result, the loading of the overlayer components (binder, stabilizer, mixed oxide, etc., and excluding the noble metal) is preferably about 1.0 grams per cubic inch (g/in$^3$) or less, with about 0.8 to 1.0 g/in$^3$ preferred, and about 0.9 to about 1.0 g/in$^3$ especially preferred.

Figure 2:
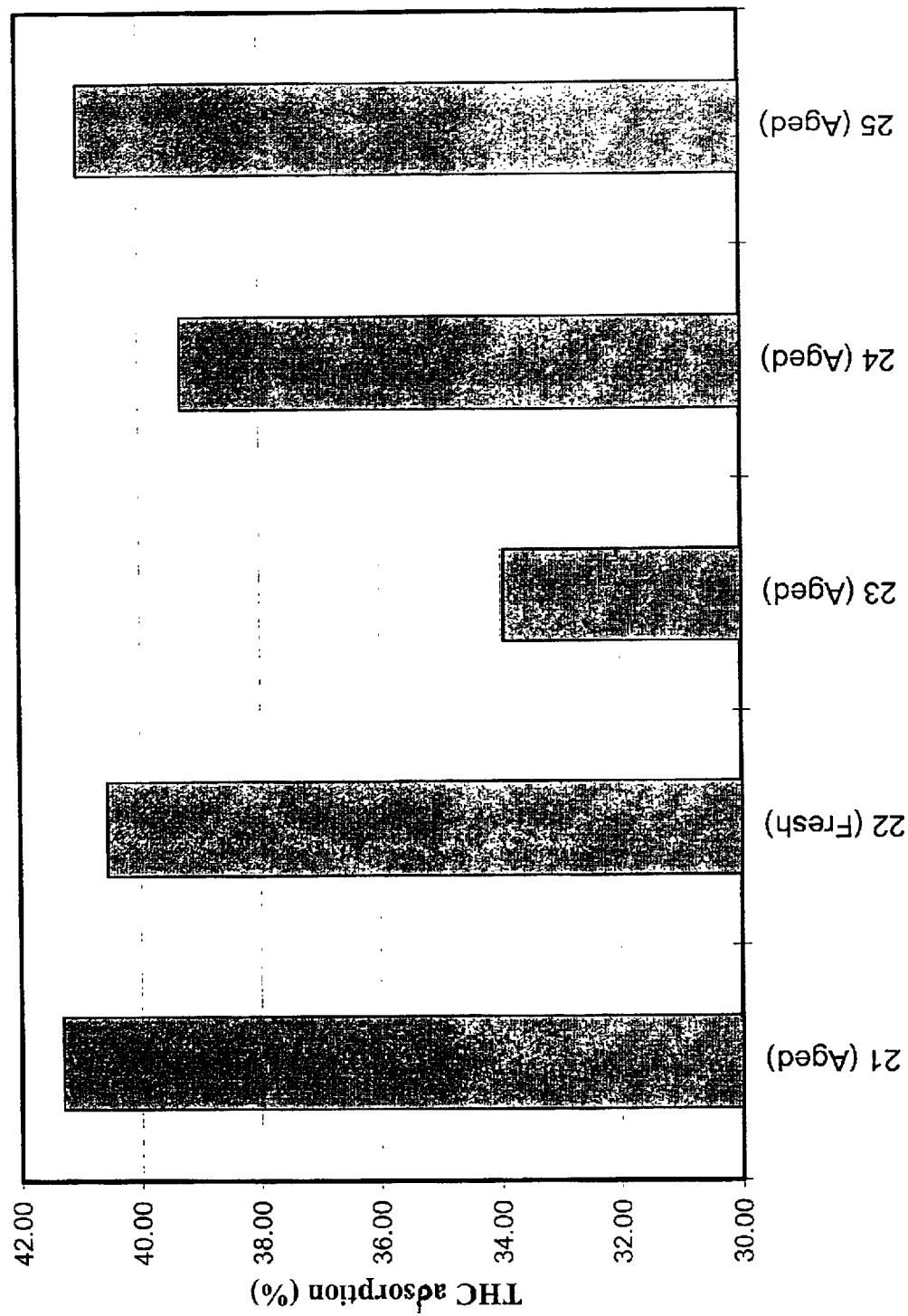
FIG. 2 shows a comparison of hydrocarbon adsorption of fresh and aged adsorbers with aging performed on a gasoline engine dynamometer with catalyst bed temperature averaging 960° C. (peak temperature was 975° C.), and with a duration of 75 hours.

Referring to FIG. 2, a chart comparing adsorbers shows the improvement in using a reduced overlayer after severe aging. The fresh adsorber (i.e., unaged) having an underlayer (zeolite) loading of 1.8, an overlayer loading of 2.0 (excluding the Pd), and Pd loading of 0.116 g/in$^3$, shows a hydrocarbon adsorption percentage of about 40.5%, as is represented by bar 22. After aging, the adsorber comprising the above overlayer and underlayer has a hydrocarbon adsorption percentage of about 34.0%. Whereas, aged adsorbers illustrated by bars 24 (comprising lanthana stabilized gamma alumina in the overlayer) and 25 (comprising delta alumina in the overlayer), which represent adsorbers having an underlayer (zeolite) loading of 2.7, an overlayer loading of 0.9 (excluding the Pd) and Pd loading of 0.174 g/in$^3$, had hydrocarbon adsorption percentages of about 39.3% and about 41%, respectively. These hydrocarbons adsorption percentages compare well with the fresh (unaged) adsorber (bar 22) and an aged adsorber having no overlayer (bar 21)(i.e., no noble metal). Furthermore, the adsorbers represented by bars 24 and 25 illustrate nearly equivalent adsorption as the aged adsorber (represented by bar 21) having no overlayer (i.e., within experimental error).

The improved catalyzed adsorber provides effective and durable treatment of exhaust gas from internal combustion engines, and in particular, for adsorbing hydrocarbons contained in engine exhaust gas during cold start. These hydrocarbons are released when the engine exhaust gas has heated the adsorber to normal operating temperature. Thereby, the hydrocarbons are catalyzed to produce the products of carbon dioxide and water. With an additional embodiment, adsorbers are manufactured with a reduced overlayer. The reduced overlayer adsorbers maintain HC light off activity, while improving HC adsorption capacity, and are better able to tolerate the more severe aging required with European driving conditions without significant loss of its adsorption capability of hydrocarbons.

It will be understood that a person skilled in the art may make modifications to the preferred embodiments shown herein within the scope and intent of claims. While the present invention has been described as carried out in specific embodiment thereof, is not intended to be limited thereby but is intended to cover the invention broadly within the scope in spirit of the claims.

What is claimed is:

1. A catalyzed adsorber for treating exhaust gas, comprising:
    a substrate;
    a zeolite underlayer disposed over the substrate, wherein the zeolite is a faujasite having a Si/Al ratio of about 3.0 to about 10; and
    a catalyst overlayer disposed over the underlayer, wherein the overlayer is zeolite free comprising less than about 3% zeolite, wherein an overlayer non-catalyst loading is less than about 1.0 g/in$^3$, and wherein an overlayer catalyst loading is about 0.1 to about 0.5 g/in$^3$.

2. The catalyzed adsorber of claim 1, wherein the substrate is a cordierite monolith material.

3. The catalyzed adsorber of claim 1 wherein the overlayer has a thickness less than about 30 microns.

4. The catalyzed adsorber of claim 1, wherein the underlayer further comprises an inorganic oxide.

5. The catalyzed adsorber of claim 4, wherein the inorganic oxide is alumina.

6. The catalyzed adsorber of claim 1, wherein the overlayer non-catalyst loading is about 0.8 to about 1.0 g/in$^3$.

7. The catalyzed adsorber of claim 6, wherein the overlayer non-catalyst loading is about 0.9 to about 1.0 g/in$^3$.

8. The catalyzed adsorber of claim 1, wherein the overlayer has a catalyst loading of about 0.1 to about 0.25 g/in$^3$.

9. The catalyzed adsorber of claim 1, wherein the overlayer has a catalyst loading of about 0.1 to about 0.2 g/in$^3$.

10. The catalyzed adsorber of claim 1, wherein the catalyst is selected from the group consisting of palladium, platinum, rhodium, and mixtures and alloys comprising at least one of the foregoing catalysts.

11. The catalyzed adsorber of claim 1, wherein the overlayer further comprises an inorganic oxide.

12. The catalyzed adsorber of claim 11, wherein the inorganic oxide is selected from the group consisting of alumina, silica, titania, magnesia, zirconia, beryllia, ceria, lanthana, zirconia, and compounds and mixtures comprising at least one of the foregoing inorganic oxides.

13. The catalyzed adsorber of claim 12, wherein the inorganic oxide is selected from the group consisting of delta phase alumina, gamma phase alumina, and combinations comprising at least one of the foregoing inorganic oxides.

14. The catalyzed adsorber of claim 13, wherein the inorganic oxide is lanthanum stabilized gamma phase alumina.

15. The catalyzed adsorber of claim 1, wherein the zeolite has a sodium content of less than 0.1 wt. % of the total weight of the zeolite.

16. The catalyzed adsorber of claim 1, wherein the underlayer is noble metal free.

17. A method for making a catalyzed adsorber system for treating exhaust gas, comprising:
    providing a substrate;
    disposing a zeolite underlayer over the substrate, the zeolite is a faujasite having a Si/Al ratio of about 3.0 to about 10; and
    disposing a catalyst overlayer over the underlayer, wherein the overlayer is zeolite free, wherein an overlayer non-catalyst loading is less than about 1.0 g/in$^3$, and wherein an overlayer catalyst loading is about 0.1 to about 0.5 g/in$^3$.

18. The method for making the catalyzed adsorber as in claim 17, wherein the overlayer non-catalyst loading is about 0.8 to about 1.0 g/in$^3$.

19. The method for making the catalyzed adsorber as in claim 18, wherein the overlayer non-catalyst loading is about 0.9 to about 1.0 g/in$^3$.

20. The method for making the catalyzed adsorber as in claim 19, wherein the overlayer has a catalyst loading of about 0.1 to about 0.25 g/in$^3$.

21. The method for making the catalyzed adsorber as in claim 17, wherein the overlayer has a catalyst loading of about 0.1 to about 0.2 g/in$^3$.

22. The method for making the catalyzed adsorber as in claim 17, wherein the catalyst is selected from the group consisting of palladium, platinum, rhodium, and mixtures and alloys comprising at least one of the foregoing catalysts.

23. The method for making the catalyzed adsorber as in claim 17, wherein the overlayer comprises less than about 3% zeolite.

24. The method for making the catalyzed adsorber as in claim 17, wherein the overlayer further comprises an inorganic oxide.

25. The method for making the catalyzed adsorber as in claim 24, wherein the inorganic oxide is selected from the group consisting of alumina, silica, titania, magnesia, zirconia, beryllia, ceria, lanthana, zirconia, and compounds and mixtures comprising at least one of the foregoing inorganic oxides.

26. The method for making the catalyzed adsorber as in claim 25, wherein the inorganic oxide is selected from the group consisting of delta phase alumina, gamma phase alumina, and combinations comprising at least one of the foregoing inorganic oxides.

27. The method for making the catalyzed adsorber as in claim 26, wherein the inorganic oxide is lanthanum stabilized gamma phase alumina.

28. The method of claim 17, wherein the zeolite has a sodium content of less than 0.1 wt. % of the total weight of the zeolite.

29. The method of claim 17, wherein the underlayer is noble metal free.

30. A catalyzed adsorber for treating exhaust gas, comprising:

a substrate;

a zeolite underlayer disposed over the substrate, wherein the zeolite is a faujasite having a Si/Al ratio of about 3.0 to about 10, and wherein the zeolite has a sodium content of less than 0.1 wt. % of the total weight of the zeolite; and a catalyst overlayer disposed over the underlayer, wherein the overlayer is zeolite free, wherein an overlayer non-catalyst loading is less than about 1.0 g/in$^3$, and wherein an overlayer catalyst loading is about 0.1 to about 0.5 g/in$^3$.

31. The catalyzed adsorber of claim 30, wherein the overlayer non-catalyst loading is about 0.8 to about 1.0 g/in$^3$.

32. The catalyzed adsorber of claim 30, wherein the overlayer non-catalyst loading is about 0.9 to about 1.0 g/in$^3$.

33. The catalyzed adsorber of claim 30, wherein the catalyst is selected from the group consisting of palladium, platinum, rhodium, and mixtures and alloys comprising at least one of the foregoing catalysts.

34. The catalyzed adsorber of claim 30, wherein the overlayer further comprises an inorganic oxide.

35. The catalyzed adsorber of claim 30, wherein the underlayer is noble metal free.

36. A method for making a catalyzed adsorber system for treating exhaust gas, comprising:

providing a substrate;

disposing a zeolite underlayer over the substrate, wherein the zeolite is a faujasite having a Si/Al ratio of about 3.0 to about 10, wherein the zeolite has a sodium content of less than 0.1 wt. % of the total weight of the zeolite; and disposing a catalyst overlayer over the underlayer, wherein the overlayer is zeolite free, wherein an overlayer non-catalyst loading is less than about 1.0 g/in$^3$, and wherein an overlayer catalyst loading is about 0.1 to about 0.5 g/in$^3$.

* * * * *